(No Model.)

A. C. MITCHELL.
Device for Throwing on and off a Belt.

No. 242,020. Patented May 24, 1881.

WITNESSES
O. J. Lehman
Jno. Crowell Jr.

INVENTOR
A. C. Mitchell.
By Suggett & Suggett
ATTORNEYS

N. PETERS, Photo-Lithographer, Washington, D. C.

UNITED STATES PATENT OFFICE.

ADOLPH C. MITCHELL, OF CLEVELAND, OHIO, ASSIGNOR TO WHITE SEWING MACHINE COMPANY, OF SAME PLACE.

DEVICE FOR THROWING ON AND OFF A BELT.

SPECIFICATION forming part of Letters Patent No. 242,020, dated May 24, 1881.

Application filed October 21, 1880. (No model.)

*To all whom it may concern:*

Be it known that I, ADOLPH C. MITCHELL, of Cleveland, in the county of Cuyahoga and State of Ohio, have invented certain new and useful Improvements in Devices for Throwing On and Off a Belt; and I do hereby declare the following to be a full, clear, and exact description of the invention, such as will enable others skilled in the art to which it pertains to make and use it, reference being had to the accompanying drawings, which form part of this specification.

My invention relates to a device for putting a belt upon a pulley, and also for disconnecting a belt from a pulley; and it consists in a dog attached to the pulley and so pivoted that it may be held in a position bearing upon the belt upon the pulley or open out of the way and held in either position by means of a spring.

Figure 1:
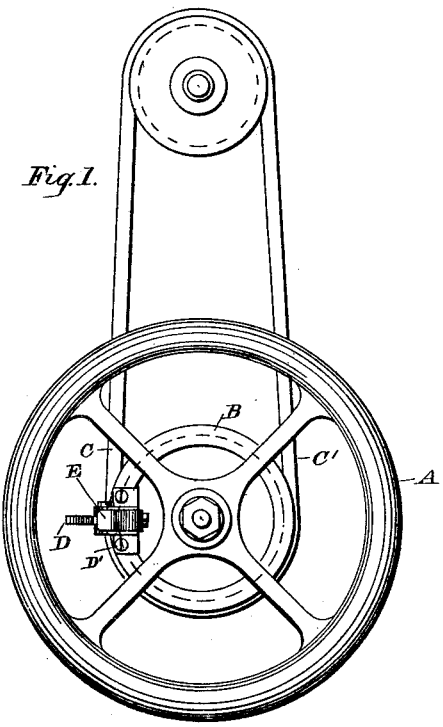
Figure 2:
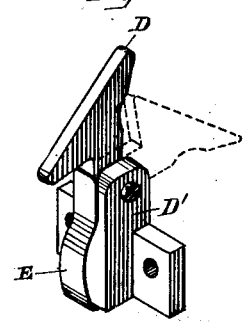
Figure 3:
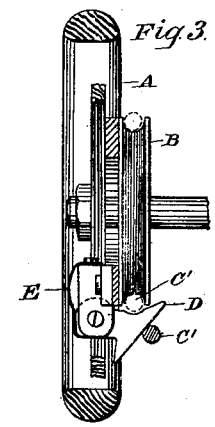

In the drawings, Figure 1 is a view, in elevation, of my device attached to a pulley and in a closed position against the pulley and belt, and in the position it occupies when used to throw the belt upon the pulley. Fig. 2 is a detached view, in perspective, of my device in an open position, indicating in broken lines its position when closed. Fig. 3 is a vertical sectional view of a pulley attached to a balance-wheel, the former supplied with my device, and showing, in cross-section, the position of the device and of the belt, both in being placed upon the pulley and thrown off from the pulley.

In the said drawings, A represents a fly-wheel, to which is permanently attached the pulley B. This pulley is made to revolve by means of the belt C C'. To the pulley is attached my device for throwing on or off the belt. This consists of the dog D, pivoted to a frame, D', and retained in either an open or closed position by means of the spring E. This dog is preferably constructed in the angular shape shown in the drawings, so as to present an inclined face to the belt when it is desired to be used in throwing the belt off.

When it is desired to put the belt upon the pulley the operation of my device is as follows: As shown in Fig. 1, a portion, C, of the belt C C' is placed in the groove of the pulley at the point indicated by the position of the device in Fig. 1 of the drawings. The dog is closed against the belt, as shown in Fig. 3, when the pulley is made to revolve in the direction of the arrow. The dog will hold the belt firmly in place as the pulley is turned. The belt, following the dog, will fall into the groove. After the dog has reached that portion of the belt indicated in the drawings as C' it will be thrown back off the pulley, and the belt will continue to turn on the pulley.

If it is desired to throw off the belt from the pulley, the dog is closed upon the pulley at any point between the portions of the belt indicated by C and C', when the pulley may be turned in either direction. The dog D, coming in contact with the belt, will throw it from the groove, and if it completes a revolution it will entirely disconnect the belt from the pulley.

This device will be found especially valuable in small machinery, where it is desired to often throw on or off a belt, and it is more particularly adapted for sewing-machines; but I do not limit myself in any degree to the size, shape, or specific construction of this device.

What I claim is—

The combination, with a belt and pulley, of a pivoted dog, D, having one edge provided with a recess for engaging a belt and retaining it in contact with a pulley, and its opposite edge formed on an incline throughout its length for disengaging the belt from the pulley and throwing it to the outside thereof, and a spring for retaining the belt in either one of its adjustments, substantially as set forth.

In testimony whereof I have signed my name to this specification in the presence of two subscribing witnesses.

ADOLPH C. MITCHELL.

Witnesses:
 JNO. CROWELL, Jr.,
 W. E. DONNELLY.